Figure 3:
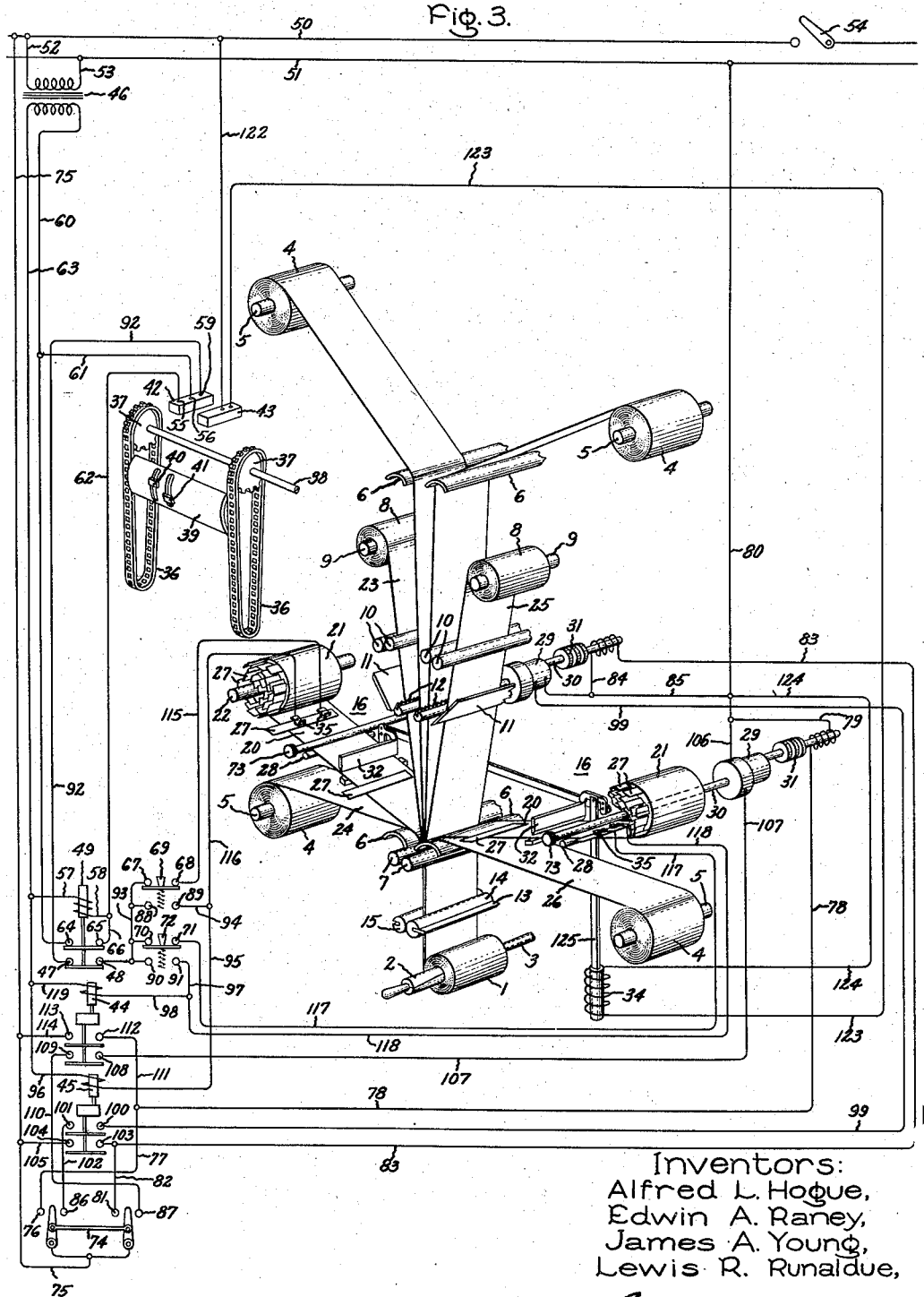

April 3, 1951　　　A. L. HOGUE ET AL　　　2,547,644
METHOD AND APPARATUS FOR INSERTION OF
TAP STRAPS IN CAPACITORS
Filed March 31, 1948　　　　　　　　　2 Sheets-Sheet 1
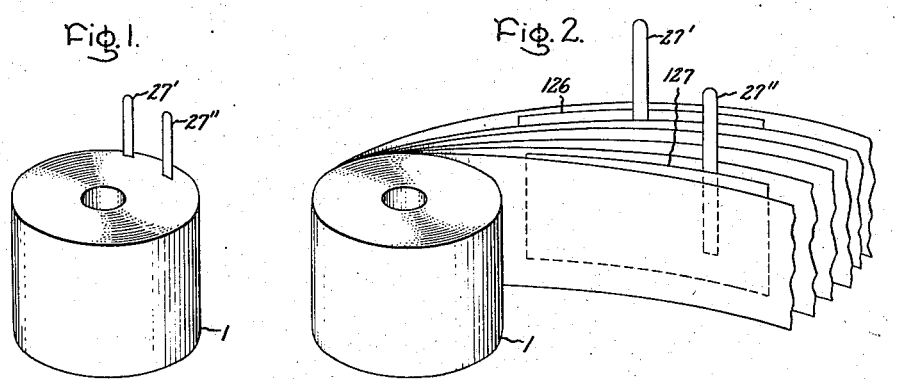
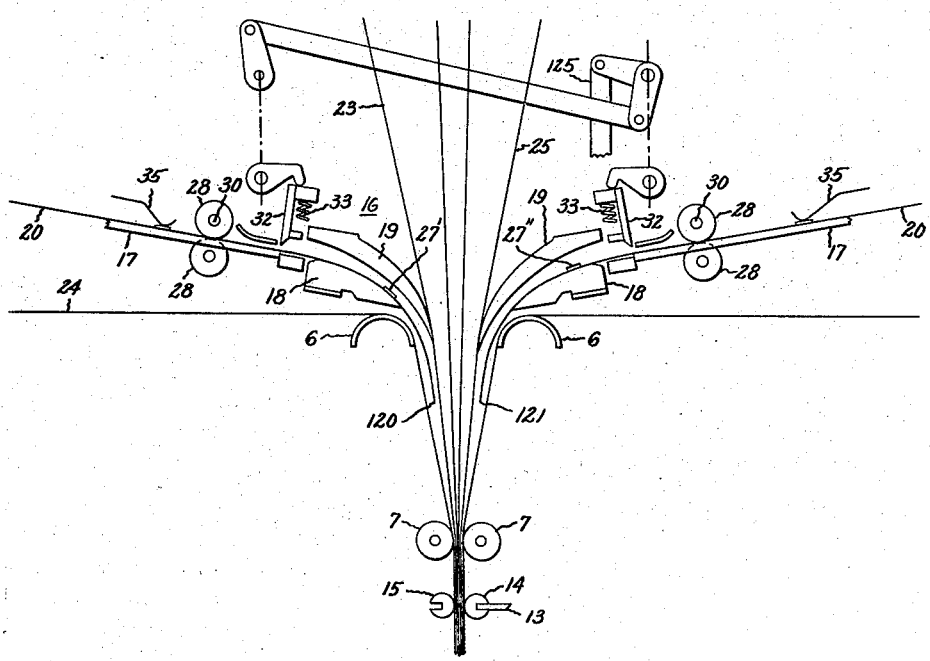
Inventors:
Alfred L. Hogue,
Edwin A. Raney,
James A. Young,
Lewis R. Runaldue,
by　Ernest C. Britton
Their Attorney.

Inventors:
Alfred L. Hogue,
Edwin A. Raney,
James A. Young,
Lewis R. Runaldue,
by Ernest C. Britton
Their Attorney.

Patented Apr. 3, 1951

2,547,644

UNITED STATES PATENT OFFICE 2,547,644

METHOD AND APPARATUS FOR INSERTION OF TAP STRAPS IN CAPACITORS

Alfred L. Hogue, Edwin A. Raney, James A. Young, and Lewis R. Runaldue, Pittsfield, Mass., assignors to General Electric Company, a corporation of New York Application March 31, 1948, Serial No. 18,104

13 Claims. (Cl. 242—56)

Our invention relates to electric condensers or capacitors of the wound type and more particularly to an improved arrangement of terminal tabs or tap straps therein, the method of assembling such tap straps to the capacitor foil or electrode during the winding operation and an apparatus for automatically carrying out the method.

The claims of the present application are directed particularly to the method and apparatus for the insertion of tap straps in capacitors while claims to the capacitor proper including an improved arrangement of tap straps therein are presented in the divisional application of Alfred L. Hogue, Serial No. 67,647, filed December 28, 1948 and assigned to the same assignee as the present invention.

In the manufacture of capacitors of the wound type, it is frequently the practice to mechanically feed alternate longitudinal strips of dielectric material, such as paper, and conducting foil from respective rolls to a winding arbor. At a predetermined time before completion of the winding cycle, a longitudinal strip of conducting material, commonly called a tap strap, is inserted between adjacent strips of conducting and dielectric material being wound in such a manner that a portion of the strip will project beyond the roll after completion to serve as a terminal connection to a terminal post mounted on the exterior of the capacitor case. In the event of a two plate or two electrode capacitor a tap strap may be conductively connected to each of the foils in this manner. Although tap straps have been inserted by temporarily stopping the winding operation, there is an obvious economic advantage in carrying out the insertion step while the alternate strips of dielectric and conducting material are traveling at relatively high speed to the winding arbor. Automatic inserting devices have been employed in the past to do this, but all such devices are inadequate in one or more respects since the tap strap at some point in the insertion operation is either dropped freely from a finger or ejected freely on to the foil or electrode strip. Consequently, the tap strap is out of control between the time it leaves a finger or ejector and the time it arrives in contact with the foil. As a result, the relatively thin metallic tap straps have been bent which has caused eventual puncturing of the adjacent dielectric strip and concentrated points of corona break-down. This lack of control has also prevented maintenance of the tap straps square or transverse to the alternate strips of material being wound and accurate relative spacing between a pair of taps in a given capacitor. This is especially important since upon subsequent assembly of the roll in an enclosure or case a pair of tap straps wound therein should align exactly with a corresponding pair of external terminals mounted in a fixed position on the case. Moreover, these prior methods of insertion do not in any way protect the dielectric strip of paper adjacent to the tap strap from the sharp edges thereof which tend to cause electrical failure either mechanically by puncturing or by corona break-down. It is therefore an object of our invention to provide a method of insertion of tap straps in a capacitor roll while being wound at the maximum winding speed without the necessity of either stopping or retarding temporarily the winding operation.

It is also an object of our invention to provide a new and improved method of completely controlling the insertion of tap straps in a capacitor roll whereby the straps will always be transverse with respect to the wound dielectric and foil strips and will be relatively positioned in spaced relationship with a desired accuracy heretofore unobtainable.

It is a further object of our invention to positively transport and position tap straps between adjacent strips of dielectric and conducting material to obtain such complete control.

It is still a further object of our invention to provide a new and improved apparatus for automatically carrying out the method described.

In accordance with our invention, we insert the end of a longitudinal strip of mounting material such as paper, to a surface of which has been affixed a plurality of equally spaced conducting tap straps projecting laterally beyond an edge thereof, well within the V formed by adjacent and converging longitudinal strips of dielectric and conducting material being wound into a roll after which a portion of the mounting strip with a tap strap affixed thereto is severed whereby the severed portion and tap strap are wound within the roll.

Our invention will be better understood from the following description when taken in connection with the accompanying drawings and the scope of our invention will be pointed out in the appended claims. In the drawings, Fig. 1 is a perspective view of a capacitor roll incorporating our invention; Fig. 2 is a perspective view of the Fig. 1 capacitor partially unwound to better illustrate the tap strap arrangement therein; Fig. 3 is a diagrammatic view of a portion of a condenser winding machine embodying our invention; and Fig. 4 is an enlarged partial front view of the machine shown by Fig. 3 to better illustrate details of our invention.

Our invention is shown as being embodied in a condenser winding machine of the type shown in Patent No. 2,255,498 and Patent No. 2,328,520 with the exception of the tap strap ejector mechanism and related control circuit indicated in the latter patent. In the interest of simplicity we have illustrated only a portion of the winding machine sufficient to describe the relationship of our invention thereto since the machine proper is old and forms no part of our invention. Referring now to Figs. 3 and 4 of the drawings, a condenser 1 is wound on a split mandrel or arbor 2 mounted on a shaft 3 driven by a motor through an electrical control circuit neither one of which is shown but both of which are clearly illustrated and described in the above mentioned patents. The condenser or capacitor comprises alternate layers of conducting electrodes or foils and dielectric material such as paper. The paper is fed to the mandrel from rolls 4 rotatably carried on spindles 5. The paper passes over guides 6 between winding means comprising paper feed rolls 7 and mandrel 2. The foil is fed to the mandrel from rolls 8 rotatably carried on spindles 9. The foil passes to the mandrel between foil feed rolls 10 and also between the paper feed rolls winding means 7.

The paper and foil feed rolls are driven by the motor through a chain and a gear train whereby the rotation of the rolls are properly timed or related to the R. P. M. of the shaft 3 as clearly illustrated and described in the patents hereinbefore indicated. However, these rolls do not act upon the paper and foil webs during the major portion of the winding cycle since they are only in rolling contact or operative position during the end and beginning of the cycle.

Below each of the foil feed rolls 10 are cutters each comprising a stationary cutter blade 11 and a rotatable cutter blade 12. The foils are cut by rotation of the cutter 12 to a position cooperating with the stationary cutters 11. Below the paper feed rolls 7 is a paper cutter comprising a rotatable knife 13 fixed to a shaft 14 which rotates in opposite direction to a shaft 15 having a longitudinal groove therein for reception of the knife blade during the cutting operation.

The description thus far has dealt entirely with parts of a condenser winding machine which is described in greater detail in the aforementioned patents.

Below the foil cutters and between adjacent strips of foil and paper are diagrammatically illustrated our tap strap inserters or injectors generally indicated by the numerals 16 and shown in greatest detail in Fig. 4. Each injector comprises a frame or feed plate 17 and a pair of guides 18 and 19 fixedly mounted on the winding machine. The left hand injector serves the purpose of supporting and directing a longitudinal strip of mounting material 20 off of a supply roll 21 rotatably mounted on a spindle 22 to the right and downwardly between adjacent strips of conducting foil and dielectric paper 23 and 24 respectively converging at winding means 7. The right hand injector serves the purpose of supporting and directing another longitudinal strip of mounting material 20 off of a supply roll 21 rotatably mounted on a spindle not shown, to the left and downwardly between adjacent strips of conducting foil and dielectric paper 25 and 26 respectively also converging at winding means 7. Each roll of mounting material comprises a longitudinal strip of almost any material such as paper having a plurality of equally spaced terminal tabs or tap straps 27 of conducting material affixedly mounted on a surface and projecting laterally beyond a longitudinal edge thereof. The mounting strips are respectively fed over the feed plates 17 between the respective guides 18 and 19 by separate pairs of feed rollers 28. One or both of each pair of feed rollers is made of resilient material and the pairs are mounted in rolling contact so that the mounting strip will be firmly and frictionally grasped therebetween. One of each pair of feed rollers is respectively driven or rotated by electric motors 29 by means of motor shafts 30. Each motor 29 is provided with a solenoid released brake 31 so that movement of the mounting strips will be prevented when the motors are deenergized. A pair of cutting knives 32 are transversely positioned respectively above each feed plate between the feed rolls 28 and guides 18 and 19. Each knife is slideably mounted for movement normal to the surface of the feed plate and is normally biased by biasing means 33 away from the feed plate and the mounting strip which passes thereover. A solenoid 34, when energized, is effective through a system of levers, diagrammatically represented, to simultaneously force the cutting edge of each knife against the spring bias to the feed plates and transversely through each mounting strip. Separate pairs of contacts 35 are mounted for respective slideable engagement with the surface of each mounting strip and the tap straps affixed thereto. At this point, it should particularly be observed that although the pairs of feed rollers and knives are symmetrically positioned respectively at equal distances from the converging paths of conducting foil and dielectric paper, the pair of contacts on the right are located at a greater distance therefrom and from the right hand knife than are the pair of contacts on the left from the paths and the left hand knife.

The synchronization of our tap insertion operation with the winding cycle is partially controlled by control chains 36 mounted on sprockets 37 in turn rotatably mounted on shaft 38 interconnected by a speed reducer and chains or a gear train, not shown, with arbor shaft 3. Fixed between the chains is a plate 39 carrying adjustable members 40 and 41 for respectively operating microswitches 42 and 43. The circuit controlled by microswitch 43 is normally open except when mechanically held closed by the engagement of member 41 therewith. Microswitch 42 is comparable to a single pole double throw switch controlling two circuits one of which is normally closed and the other open except when member 40 is in mechanical engagement therewith during which time the former circuit is opened while the latter is closed.

The energization of feed roll motors 29 and brake solenoids 31 are directly controlled respectively through the contacts of ratchet relays 44 and 45. Each ratchet relay comprises the combination of a solenoid, a pawl, a ratchet or rack, and a cam. Upon energization of the solenoid the pawl mounted thereon engages the teeth on and moves a ratchet wheel or rack which in turn rotates the cam thereby completing or breaking one or more circuits. Upon subsequent deenergization of the solenoid the pawl slips back over the teeth of the ratchet wheel without further turning the cam. Subsequent energization of the solenoid turns the cam to break the formerly completed circuit or complete the formerly broken circuit as the case may have been. In other words, the contacts remain in the same position after energization, for example, of the solenoid until the coil thereof is deenergized and again energized. Flow of current to the ratchet relay solenoids from isolation transformer 46 is primarily controlled by contacts 47 and 48 of holding relay 49 the solenoid of which is also energized by the isolation transformer.

Prior to the start of a winding cycle or operation as described in detail in the patents hereinbefore mentioned, current is fed from main line conductors 50 and 51 through conductors 52 and 53 to the isolation transformer 46 by closing the power switch 54. However, tap strap injector motors 29 will not thereby be energized since the ratchet relays will be in the position indicated in Fig. 3 with their solenoids deenergized and their contacts open inasmuch as their solenoid circuits are controlled by the holding relay 49 the contacts of which, at this point in the cycle, are not bridged as indicated in Fig. 3. This is the case since contacts 55 and 56 of microswitch 42 controlling the circuit through conductors 57 and 58 to and from the holding solenoid 49 are not bridged since the switch arm of microswitch 42 is so biased that contacts 56 and 59 are normally bridged. Bridging of contacts 56 and 55 is however accomplished against the biasing means either manually or automatically by adjustable member 40 on plate 39 provided the winding motor is started which drives shaft 38 by way of shaft 3. In either event, the holding solenoid coil is thereby energized from the transformer 46 through conductors 60 and 61, contacts 56 and 55, conductors 62, 58, 57 and 63. Such energization of the holding relay will not only bridge contacts 47 and 48 but contacts 64 and 65 thereof will also simultaneously be bridged so that upon breaking of this circuit and almost instantaneous bridging of contacts 56 and 59 by either manual release of microswitch 42 or subsequent passage of member 40 out of engagement therewith the holding solenoid will nevertheless remain energized through conductor 60, contacts 64 and 65, conductors 66, 58, 57 and 63.

The ends of each mounting strip 20 are next manually fed under contacts 35 up to the respective feed rolls 28. Since contacts 67 and 68 of left hand push button 69 and contacts 70 and 71 of right hand push button 72 are biasedly bridged and neither pair of contacts 35 are bridged at this point, ratchet relays 44 and 45 are still deenergized and therefore feed motors 29 are both deenergized and braked by breaks 31. Consequently, in order to permit manual feeding of the ends of each mounting strip between the respective feed rolls by turning hand knobs 73, the brakes must be released by energization of the brake solenoids which is accomplished by throwing manual toggle switch 74 to the left which completes a power circuit to the right hand break solenoid from main line conductor 50 through conductor 75, contact 76, conductors 77, 78, 79 and 80 to main line conductor 51 and to the left hand break solenoid from conductor 75, contact 81, conductors 82, 83, 84, 85 and 86 to main line conductor 51. After the mounting strips have thus been started through the feed rolls by hand, the toggle switch 74 is swung to the right so that the arms thereof will be in engagement with contacts 86 and 87 respectively.

To bring the first tap straps 27' and 27'' up to the inserter contacts 35 the left and right hand push buttons 69 and 72 respectively are pushed down which bridges contacts 88—89 and contacts 90—91 respectively which thereby completes a power circuit to the left hand ratchet relay solenoid 45 from transformer 46 through conductors 60 and 61 microswitch contacts 56 and 59, conductor 92, holding relay contacts 47 and 48, conductor 93, push button contacts 88 and 89, conductors 94, 95, 96 and 63 and to the right hand ratchet relay solenoid 44 through conductors 60 and 61, microswitch contacts 56 and 59, conductor 92, holding solenoid contacts 47 and 48, conductor 93, push button contacts 90 and 91, conductors 97, 98, 119 and 63. The ratchet relays will thus be actuated to bridge both sets of contacts of each to thereby simultaneously release solenoid operated brakes 31 and start motors 29 and feed rollers 28. In this case power is fed to the left hand motor from line conductor 51 to conductors 80 and 85 through the motor to conductor 99, ratchet relay contacts 100 and 101, conductor 102, toggle switch contact 86, conductor 75 to line conductor 50 and power is simultaneously fed to left hand brake solenoid from line conductor 51 to conductors 80, 85 and 84, through the solenoid to conductor 83, ratchet relay contacts 103 and 104, conductors 105 and 75 to line conductor 50 while power is fed to the right hand motor from line conductor 51 to conductors 80 and 106 through the motor to conductor 107, ratchet relay contacts 108 and 109, conductor 110 toggle switch contact 87 and conductor 75 to line conductor 50 and power is simultaneously fed to the right hand break solenoid from line conductor 51 to conductors 80 and 79, through the solenoid to conductors 78 and 111, ratchet relay contacts 112 and 113, conductors 114 and 75 to line conductor 50.

Release of the push buttons to the position indicated in Fig. 3 breaks the circuit to and deenergized the ratchet relay solenoids to return the pawls therein to their initial position. However, as previous pointed out, the cams therein are not rotated by this motion of the pawl and as a result the ratchet relay contacts are continued bridged until such time as the first tap strap arrives under the pair of contacts 35 when the ratchet relay solenoids are again energized by way of, in the case of the left hand ratchet relay, holding solenoid contacts 47 and 48, conductor 93, normally closed push button contacts 67 and 68, conductor 115, one of the contacts 35 through the tap strap to the other contact, conductors 116 and 95 through the left hand solenoid and conductors 96 and 63 to the isolation transformer and, in the case of the right hand ratchet relay, by way of holding solenoid contacts 47 and 48, conductor 93, normally closed push button contacts 70 and 71, conductor 117, one of right hand contacts 35 through a tap strap to the other contact, conductors 118 and 98 through the right hand solenoid and conductors 119 and 63 to the isolation transformer. Energization of the ratchet relays solenoids as thus described actuates the pawls therein to rotate the cams whereby the power circuit to the inserter motors 29 and brake solenoids 31 are broken and rotation of feed rolls 28 is stopped. However, it is to be remembered that at this point the ratchet relays are still energized with the pawls therein in their advanced position.

With a tap strap thus positioned under each pair of contacts 35 the winding cycle of a capacitor is now ready to be started. At a predetermined time after start of the winding cycle, depending upon the synchronization between control chain shaft 38 and mandrel shaft 3, adjustable member 40 on the control chain arrives under microswitch 42 and trips it to break the circuit across contacts 56 and 59 which deenergizes the ratchet relay solenoids to return the pawls therein to their initial starting position. Subsequently member 40 moves out of engagement with microswitch 42 and the switch arm therein snaps back to complete the circuit across contacts 56 and 59 and across the tap straps to the ratchet relay solenoids whereby the contacts thereof are bridged to simultaneously release both solenoid brakes 31 and start both motors 29 to feed the free end of the left hand mounting strip to the right and the free end of the right hand mounting strip to the left toward the alternate strips of dielectric paper and conducting foil travelling at relatively high speed between winding means feed rolls 7 to mandrel 2. The tap straps which were under the respective pairs of contacts 35 will thereby be moved out of engagement therefrom which breaks the power circuit to the ratchet relays but the motors will nevertheless continue to rotate the feed rolls as hereinbefore explained. The feed of the mounting strips within the V's formed by converging foil and dielectric strips 23 and 24 and between converging foil and dielectric strips 25 and 26 continues until the next adjacent tap strap on each mounting strip respectively engages a pair of contacts 35 whereby the ratchet relays are again energized to simultaneously break the injector feed motor and break solenoid power circuits to stop the feed rolls and the ends 120 and 121 of the respective mounting strips at the approximate position indicated in Fig. 4.

Since the tap straps on both mounting strips are spaced at the same and equal distance apart and inasmuch as both knives 32 are symmetrically arranged with respect to and at equal distances from the converging alternate strips of dielectric paper and foil it should be observed that the end of each mounting strip will be fed to the same depth within adjacent and converging dielectric and conducting strips. It should, however, be observed that since the pairs of tap strap contacts 35 which control the stopping of the feed rolls are respectively at different distances from the converging foil and dielectric strips, the tap strap 27' about to be inserted from the left hand mounting strip has been positioned further within the adjacent conducting and dielectric strips 23 and 24 than the tap strap 27" on the right hand mounting strip has been positioned within the adjacent strips 25 and 26.

Each mounting strip is held in the position indicated in Fig. 4 for a predetermined time upon the termination of which adjustable member 41 on the control chains 36 will have arrived under normally open microswitch 43 to bridge the contacts therein and complete a power circuit from line conductor 50, through conductor 122, across the microswitch contacts, conductor 123, through knife operating solenoid 34, conductors 124 and 89 to line conductor 51. The energization of solenoid 34 thereby will pull rod 125 downwardly to simultaneously force both knife blades 32, against their spring bias, transversely through both mounting strips. The severed portions 126 and 127 with a tap strap 27' and 27" respectively affixed to each will then pass downwardly with the alternate strips of dielectric paper and conducting foil travelling at the maximum winding speed and be wound therebetween by the winding means.

After passage of adjustable member 41 out of engagement with microswitch 43 the solenoid 34 will become deenergized and the knives 32 will automatically raise upwardly by virtue of their biasing means 33. During subsequent winding of other capacitor rolls, the insertion cycle as hereinbefore outlined will be repeated automatically and because of the great number of tap straps which may be mounted on a longitudinal strip of mounting material a single roll thereof will be sufficient for several days production of capacitors.

In the interest of clarity, we have not illustrated the ends of the mounting strips in Fig. 4 as far within the V's formed by the converging and adjacent dielectric and conducting strips as they are in practice. Actually, the ends are fed very close to the rolls 7 so that during the predetermined time between the termination of the feed by feed rolls 28 and the severing of the mounting strips by knives 32, the mounting strips are in frictional engagement or contact with the adjacent strips of paper and foil. Consequently, after severing by the knives, the severed portions with tap straps attached thereto are actually seized or snatched by the fast travelling strips of dielectric paper and foil.

Thus we have provided a positive transport method and means whereby a pair of tap straps under complete control at all portions of the insertion cycle are automatically inserted within a capacitor roll and positioned therein transversely to the alternate strips of dielectric paper and conducting foil thereof at a desired space relationship to each other. Moreover, we have provided an improved capacitor in which the severed portion of the mounting strips serves to increase the insulation between the tap straps and the foil of opposite polarity thereby reducing the danger of electrical breakdown through the paper dielectric due to the sharp edges of the tap material.

While we have, in accordance with the patent statutes, shown and described a particular embodiment of our invention including the method of operation together with the apparatus for automatically carrying it out, other changes will be obvious to those skilled in the art and we, therefore, aim in the appended claims to cover all such changes as fall within the true spirit and scope of our invention.

What we claim as new and desire to secure by Letters Patent of the United States is:

1. In the process of winding capacitors having provision for moving adjacent strips of dielectric and conducting material along spaced path to winding means, the method of inserting a conducting tap strap therein which comprises the step of inserting a single piece of mounting material having a conducting tap strap affixed to a surface and projecting beyond an edge thereof between said moving and adjacent strips of dielectric and conducting material so that said mounting material with said tap strap will be seized by said moving adjacent strips and wound therebetween by said winding means.

2. In the process of winding capacitors having provision for moving adjacent strips of dielectric and conducting material along spaced paths to winding means, the method of inserting a conducting tap strap therein which comprises the step of inserting an end of a single piece of material having a relatively narrow conducting portion projecting beyond an edge thereof between and in frictional engagement with said moving and adjacent strips of dielectric and conducting material so that said piece of material will be seized by said moving adjacent strips and wound therebetween by said winding means.

3. The method of inserting a tap strap in a capacitor roll from a longitudinal strip of mounting material having a plurality of equally spaced conducting tap straps affixed to a surface and projecting beyond a longitudinal edge thereof which comprises the steps of feeding a transverse end of said mounting material between adjacent strips of dielectric and conducting material moving along spaced paths to winding means, stopping said feed at a predetermined position and then transversely severing said mounting strip at a point between adjacent tap straps so that said severed portion with a tap strap affixed thereto will be seized by said moving strips of dielectric and conducting material and wound therebetween by said winding means.

4. The method of inserting a tap strap in a capacitor roll from a longitudinal strip of mounting material having a plurality of equally spaced conducting tap straps affixed to a surface and projecting laterally beyond an edge thereof which comprises the steps of feeding a free end of said longitudinal strip of mounting material between and in frictional engagement with adjacent strips of dielectric and conducting material moving along spaced paths and converging at a winding means so that said tap straps are transverse to said adjacent strips of dielectric and conducting material, stopping the feeding of said mounting strip for a predetermined time and then transversely severing said mounting strip at a point between adjacent tap straps so that said severed portion with a tap strap affixed thereto will be seized by said moving strips of dielectric and conducting material and wound therebetween by said winding means.

5. In the manufacture of a capacitor having alternate sheets of dielectric material and conducting foil wound into a roll, the method of inserting a tap strap therein from a supply roll consisting of a longitudinal strip of mounting material having a plurality of equally spaced conducting tap straps affixed to a surface and projecting beyond a longitudinal edge thereof which comprises the steps of feeding a transverse end of said strip of mounting material between moving adjacent longitudinal sheets of dielectric material and conducting foil, stopping said feed at a predetermined position for a predetermined time and transversely severing a portion of said strip of mounting material from said supply roll at a point between adjacent tap straps so that the severed portion with a tap strap affixed thereto will be seized by said moving sheets of adjacent foil and dielectric material and wound therebetween into said capacitor roll.

6. The method of inserting a tap strap in a capacitor roll from a longitudinal strip of mounting material having a plurality of equally spaced conducting tap straps affixed to a surface and projecting beyond a longitudinal edge thereof which comprises the steps of feeding a transverse end of said mounting material between and in the direction of movement of adjacent strips of dielectric and conducting material moving along spaced paths to winding means, stopping said feed for a predetermined time and transversely severing said mounting strip at a point between adjacent tap straps so that said severed portion with a tap strap affixed thereto will be seized by said moving strips of dielectric and conducting material and wound therebetween by said winding means.

7. The method of inserting a tap strap in a capacitor roll from a longitudinal strip of mounting material having a plurality of equally spaced conducting tap straps affixed to a surface and projecting transversely beyond a longitudinal edge thereof which comprises the steps of feeding a transverse end of said mounting material between adjacent longitudinal strips of dielectric and conducting material moving along spaced paths to winding means so that said tap straps are transverse to said adjacent strips of dielectric and conducting material, stopping said feed for a predetermined time and transversely severing said mounting strip at a point between adjacent tap straps so that said severed portion with a tap strap affixed thereto will be seized by said moving strips of dielectric and conducting materials and wound therebetween by said winding means.

8. The method of inserting a tap strap in a capacitor roll from a longitudinal strip of mounting material having a plurality of equally spaced conducting tap straps affixed to a surface and extending transversely beyond a longitudinal edge thereof which comprises the steps of feeding a transverse end of said mounting material between and in the direction of movement of adjacent strips of dielectric and conducting material moving along spaced paths to winding means so that said tap straps are transverse to said adjacent strips of dielectric and conducting material, stopping said feed for a predetermined time and transversely severing said mounting strip at a point between adjacent tap straps so that said severed portion with a tap strap affixed thereto will be seized by said moving strips of dielectric and conducting material and wound therebetween by said winding means.

9. The method of inserting a pair of conducting tap straps in a capacitor roll from respective longitudinal strips of mounting material each having a plurality of equally spaced conducting tap straps affixed to a surface and extending transversely beyond an edge thereof which comprises the steps of feeding an end of one of said strips of mounting material with a tap strap positioned a predetermined distance therefrom between, in the direction of movement of and in frictional engagement with a longitudinal strip of dielectric and a longitudinal strip of conducting materials moving along spaced paths and converging at a winding means so that said tap straps are transverse to said strips of dielectric and conducting materials, simultaneously feeding an end of the other of said strips of mounting material with a tap strap positioned from an end thereof a different distance than said first predetermined distance between, in the direction of movement of and in frictional engagement with another strip of dielectric and another strip of conducting material moving along spaced paths and converging at said winding means, simultaneously stopping the feeding of said mounting strips for a predetermined time and then simultaneously severing said mounting strips transversely at a point between adjacent tap straps to permit the seizing of the severed portions respectively by said converging dielectric and conducting strips whereby a pair of tap straps spaced at a distance equal to the difference between said first predetermined distance and said different distance will be wound therebetween by said winding means.

10. In a machine for winding capacitors having provision for feeding alternate longitudinal strips of conducting and dielectric material along spaced paths to winding means, a tap strap inserter comprising a frame arranged between adjacent paths of a dielectric and a conducting strip for supporting and directing the end of a longitudinal strip of mounting material toward the space between said conducting and dielectric strips, said mounting strip having a plurality of equally spaced conducting tap straps affixed to a surface and extending beyond a longitudinal edge thereof transversely to said paths, means for feeding said end of said mounting strip to a predetermined position between said adjacent dielectric and conducting strips and for holding said end at said predetermined position for a predetermined time, and means for transversely severing said mounting strip between adjacent tap straps.

11. In a machine for winding capacitors having provision for feeding alternate longitudinal strips of conducting and dielectric material along spaced paths which converge at a winding means, a tap strap inserter comprising a frame arranged between adjacent paths of a dielectric and a conducting strip for supporting and directing the end of a longitudinal strip of mounting material toward the convergence of said dielectric and conducting strips, said mounting strip having a plurality of equally spaced conducting tap straps affixed to a surface and extending laterally beyond an edge thereof transversely to said paths, means for feeding said end of said mounting strip to a predetermined position between and in frictional engagement with said adjacent dielectric and conducting strips and for holding said end at said predetermined position for a predetermined time, and means for transversely severing said mounting strip between adjacent tap straps.

12. In a machine for winding capacitors having provision for feeding alternate longitudinal strips of conducting and dielectric material along spaced paths which converge at a winding means, a tap strap injector comprising a frame arranged between adjacent paths of a dielectric and a conducting strip for supporting and directing the end of a longitudinal strip of mounting material toward the convergence of said dielectric and conducting strips, said mounting strip having a plurality of equally spaced conducting tap straps affixed to a surface and extending laterally beyond an edge thereof transversely to said paths, a pair of feed rollers for moving said mounting strip therebetween and feeding said end thereof to a predetermined position between and in frictional engagement with said converging dielectric and conducting strips, a pair of stationary electrical contacts mounted for sliding engagement with said surface of said mounting strip and said tap straps affixed thereto, control means including the engagement of said contacts with one of said conducting tap straps to stop said rollers and said end of said mounting strip at said predetermined position, and means for transversely severing said mounting strip between said end and said feed rollers at a point between adjacent tap straps.

13. In a machine for winding capacitors having provision for feeding alternate longitudinal strips of conducting and dielectric material along spaced paths converging at a winding means, a tap strap injector comprising a frame arranged between adjacent paths of a dielectric and a conducting strip for supporting and directing the end of a longitudinal strip of mounting material toward the convergence of said dielectric and conducting strips, said mounting strip having a plurality of equally spaced conducting tap straps affixed to a surface and extending laterally beyond an edge thereof transversely to said paths, a pair of feed rollers for moving said mounting strip therebetween and feeding said end thereof to a predetermined position between and in frictional engagement with said converging dielectric and conducting strips, an electric motor for driving said feed rollers a solenoid operated brake to simultaneously prevent rotation of said rollers when said motor is deenergized, a pair of stationary electrical contacts mounted for sliding engagement with said surface of said mounting strip and said conducting tap straps affixed thereto, control means including the engagement of said contacts with one of said conducting tap straps to deenergize said motor, lock the rotation of said feed rollers and hold said end of said mounting strip at said predetermined position, and a solenoid operated knife to transversely sever said mounting strip between said end and said feed rollers at a point between adjacent tap straps.

ALFRED L. HOGUE.
EDWIN A. RANEY.
JAMES A. YOUNG.
LEWIS R. RUNALDUE.

REFERENCES CITED

The following references are of record in the file of this patent:

UNITED STATES PATENTS

| Number | Name | Date |
| --- | --- | --- |
| 1,337,505 | Brinton | Apr. 20, 1920 |
| 1,963,381 | Purdy | June 19, 1934 |
| 2,040,323 | McCain | May 12, 1936 |
| 2,291,445 | Beyer | July 28, 1942 |
| 2,328,520 | West | Aug. 31, 1943 |